BLIND RIVET WITH SETTING PIN HAVING SUCCESSIVELY DEEPER LOCKING GROOVES

Filed Feb. 26, 1962 2 Sheets-Sheet 1

INVENTOR.
GEORGE SIEBOL
BY Fulwider Mattingly & Huntley
ATTORNEYS

INVENTOR.
GEORGE SIEBOL
BY Fulwider Mattingly & Huntley
ATTORNEYS

United States Patent Office 3,178,989 Patented Apr. 20, 1965

3,178,989

BLIND RIVET WITH SETTING PIN HAVING SUCCESSIVELY DEEPER LOCKING GROOVES

George Siebol, Garden Grove, Calif., assignor to Olympic Screw & Rivet Corporation, Downey, Calif., a corporation of California Filed Feb. 26, 1962, Ser. No. 175,395
5 Claims. (Cl. 85—71)

This invention relates to rivets and more partciularly to an improved blind rivet which is especially adapted for the riveting of lapped work pieces where access may be conveniently had from one side only. The accessible side of the work from which the rivet is applied is often referred to as the "top side," while the other side is termed the "blind side." For convenience, this terminology is used herein.

Most blind rivets presently in use include two basic parts. One of these is a tubular member, commonly called a "sleeve," having a shank and a radially enlarged head integral with one end of the shank. The other of the two rivet parts is a mandrel or setting pin telescopically received in the sleeve.

Blind rivets may be generally classified in two broad classes, one in which the setting pin is driven into the sleeve from the top side to set the rivet and the other in which the pin is pulled outwardly away from the top side to set the rivet. The former is called the drive-type, whereas the latter is called the pull-type. The present invention is concerned with rivets of the pull-type.

Prior to use, the setting pin of a pull-type blind rivet is positioned within the sleeve with its pulling section projecting from the headed end of the sleeve. In most pull-type blind rivets, the pin is provided with a head at its opposite or blind end of a diameter greater than the internal diameter of the sleeve. Thus, the head cannot pass through the sleeve at least without encountering appreciable resistance.

In conventional use, the assembled pull-type rivet is inserted from the top side, headed end of the pin first, into aligned apertures in the work pieces to be riveted. When properly oriented, the head of the sleeve abuts the top side of the work, and the tail end of the shank projects from the blind side. To set this type of rivet, a pulling force is applied to the pulling section of the pin, and a reactive or restraining force is applied to the head of the sleeve. This results in the shank being radially expanded or "upset" in various manners depending upon the particular rivet to clinch or clamp the work pieces together. As will be understood, in this condition the work pieces are clamped between the sleeve head on the top side and the radially expanded portion of the shank or blind head, as it is known in the art, on the opposite side.

In order to leave a final riveted connection which is relatively flush with the exposed top side of the work without having to trim the pin in a separate operation, it is conventional in the art to provide the pin with a weakened section termed "breakneck" groove. After the shank is upset in the manner described above, resistance to pin movement and thus tension in the pin increases under the continued application of the pulling force. The pin is arranged to fracture at the breakneck groove, when this tension reaches a predetermined maximum, whereupon the pulling section of the pin separates from the remainder thereof disposed within the sleeve.

One problem which has been encountered in connection with prior rivets of the type described above, particularly when used to rivet relatively thin work pieces or low bearing strength sheet, is that of adequate tensile strength. Under the influence of forces tending to separate the work pieces, the apertures in these thin pieces tend to open up and allow the radially enlarged tail end portion of the shank or blind head to pull through. As will be understood, the tendency of the blind head to pull through is dependent upon the area bearing on the blind side of the work. The greater the bearing area, the less the unit pressure, and, accordingly, the less tendency there is for the blind head to pull through. Thus, it will be readily understood that a successful rivet of the present type for low bearing strength sheet must be capable of developing a relatively large bearing area on the blind side of the work.

Another problem of these prior rivets with respect to tensile strength arises from the fact that the resilient metal both of the pin and sleeve is strained during setting. When the forces are rapidly released, as by fracturing the pin at the breakneck groove, the parts tend to spring back slightly. As a consequence, the clinching force on the work is relaxed somewhat resulting in a reduction of both tensile and shear strength of the connection. Moreover, the joint is apt to become loose and completely unsatisfactory in some applications.

To overcome the spring back problem, one attempted solution has been to provide a rivet embodying a sleeve with a top side collar which is swaged inwardly against the pin as setting takes place. The gripping action of the swaged metal is relied upon to prevent spring back and to maintain the parts together in their tensioned condition. Although it helps to prevent spring back, this solution is not completely satisfactory, since the pin is pinched prematurely, while still being drawn through the sleeve. This significantly increases the pulling force required to set the rivet and necessitates the use of a more powerful tool. Also, it often results in fracturing of the pin at the breakneck groove before the rivet is fully set.

Another expedient which has been partially successful in overcoming the spring back problem and in developing adequate tensile strength in prior rivets of the subject type was to provide a locking collar around the pin adjacent the head of the sleeve adapted to be swaged into an adjoining groove of the pin after the pin has been pulled the desired distance into the sleeve. Setting of such a rivet is achieved by means of a pulling tool which initially applies the reactive force to the head of the sleeve and then, after the pin is finally positioned, to the locking collar. Thus, the locking collar is not swaged inwardly until the requisite pin movement has already taken place.

Although this last mentioned expedient has been somewhat successful in overcoming spring back and in developing adequate tensile strength, it greatly increases the complexity and, hence, the manufacture and maintenance costs of the pulling tool. Besides the increased cost of the tool, the labor costs involved in setting the rivet are also substantially increased by virtue of adjustment of the tool having to be made for each new total thickness of work pieces or grip length, as it is termed in the art. It will readily be appreciated that having to make such adjustments is a substantial disadvantage when the rivet is used in the erection of structures such as buildings where a wide variety of grip lengths and operating conditions are frequently encountered. Therefore, a successful rivet for these purposes is one which is also adapted to accommodate a wide range of grip lengths and operating conditions in providing a satisfactory connection.

In view of the foregoing discussion, it is a primary object of this invention to provide a pull-type blind rivet adapted to provide a greatly improved riveted connection in a wide variety of work piece configurations and over a wide range of grip lengths.

A further object is to provide a blind rivet of the type described which is capable of developing a high bearing area on the blind side of the work during the setting operation, so as to afford a highly satisfactory connection even between work pieces comprising low bearing strength sheet.

A still further object of this invention is to provide a pull-type blind rivet embodying a headed sleeve and an associated setting pin arranged to fracture when tension therein reaches a predetermined maximum level, the two parts cooperating in such a manner that the pin fractures generally flush with the head of the sleeve when the rivet is set in lapped work pieces of a wide range of grip lengths.

A related object is to provide a rivet of the type described in which fracturing of the pin has virtually no tendency to cause spring back and, accordingly, the maximum clinching forces applied to the work pieces are maintained.

A still further object is to provide a rivet for accomplishing all of the foregoing objects, yet one which is economical both from the standpoint of initial cost and from the standpoint of labor costs incurred in setting it.

It is another object to provide a pull-type blind rivet which is adapted to be set by extremely simple and, hence, inexpensive tools.

These and other objects and advantages of the invention will be better understood when referring to the following detailed description taken in conjunction with the accompanying drawings in which.

Figures 1, 2, 3, 4, 9:
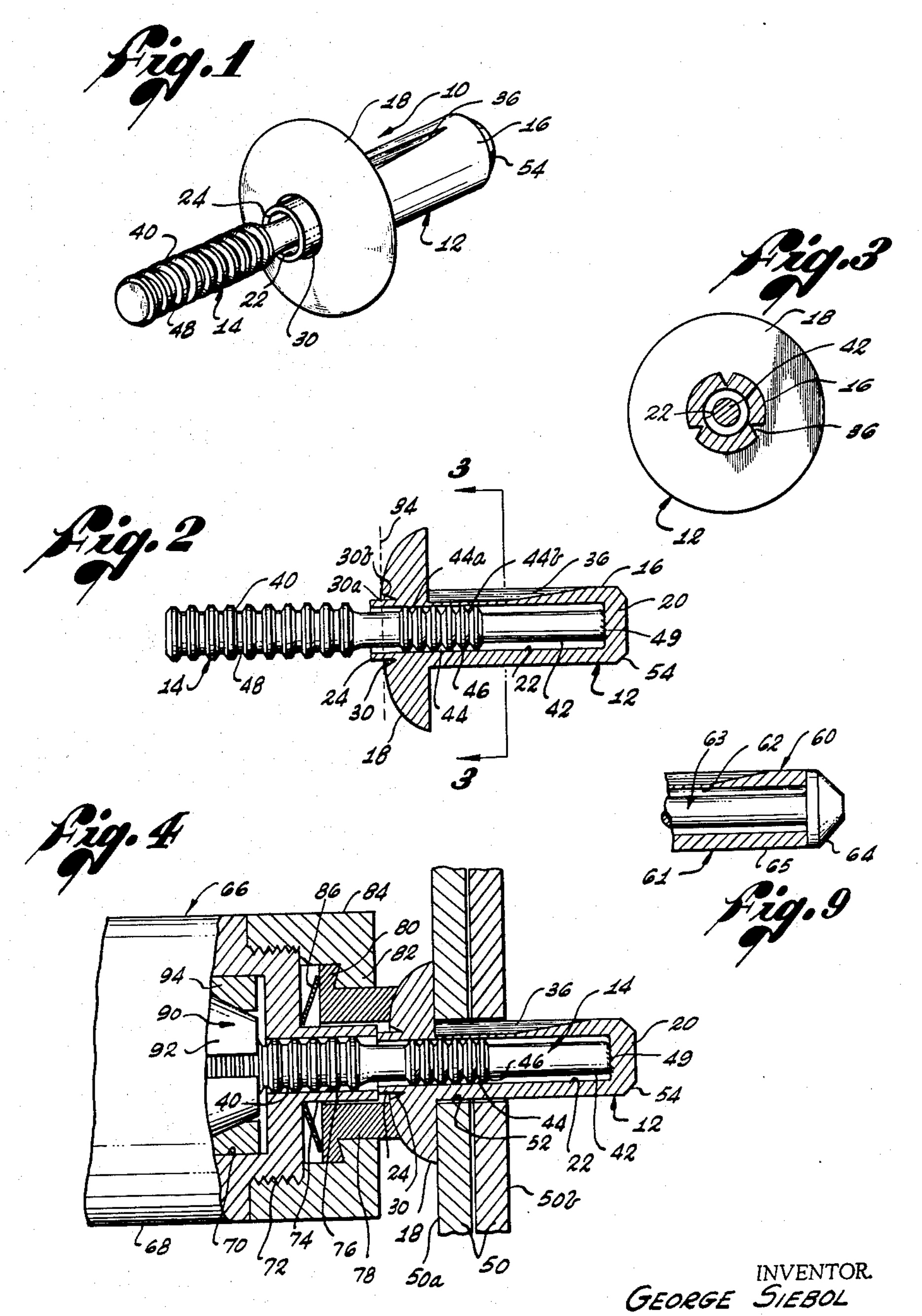
FIGURE 1 is a perspective view of a rivet constructed in accordance with the invention and illustrating the associated sleeve and pin, as assembled for use prior to setting.
FIGURE 2 is a view of the rivet of FIGURE 1 showing the sleeve in longitudinal section and the pin in elevation.
FIGURE 3 is a section taken on the line 3—3 of FIGURE 2.
FIGURE 4 is a view partially in longitudinal section and partially in elevation showing the rivet positioned in a pair of work pieces to be riveted and attached to a setting tool at the beginning of the setting operation.
FIGURE 9 is a view similar to FIGURE 2 of a modified form of the rivet of the invention and showing only those portions of the sleeve and pin which differ materially from those illustrated in FIGURE 2.

Referring to the drawings, and in particular to FIGURE 1, the rivet of the invention is indicated generally by the reference numeral 10. In the position shown in FIGURE 1, the "top side" of the rivet is to the left and the "blind side" is to the right.

As may be seen, the present rivet includes two basic parts, one of these being a sleeve 12 and the other a mandrel or setting pin 14. The construction and arrangement of the sleeve 12 and pin 14, as well as the manner in which they cooperate to provide a secure joint are described in detail below. Satisfactory results may be achieved when the two basic parts are formed of a variety of different materials. However, aluminum alloys have been found to yield particularly advantageous results.

The sleeve 12 includes a shank 16 which is tubular in shape and has a radially enlarged head 18 at one end. In the illustrative embodiment, the shank 16 is closed at the blind end as shown at 20 opposite the head 18. An axial bore 22 of uniform diameter extends inwardly from the top side of the sleeve 12 through its shank 16 to the closed end 20 of the latter.

The head 18 is here of the brazier type, although it will be understood that other head types can be used as desired. As illustrated in FIGURES 2 and 3, the head 18 has a locking crown 24 projecting axially from the top side thereof opposite the shank. The head 18 is formed with an undercut annular groove 30 immediately adjacent to and surrounding the crown 24. The groove 30 is generally conically shaped with its inner wall 30*a* being parallel to the longitudinal axis of the sleeve 12 and its outer wall 30*b* sloping inwardly toward the axis from top to bottom.

As may be seen, the inner groove wall 30*a* defines the base periphery of the crown 24, and together with the axial bore 22 in the sleeve 12 makes the crown cylindrical in shape with a uniform wall thickness.

For purposes of description, the projecting portion of the crown 24 is considered to be that portion initially projecting outwardly beyond the plane defined by the top of the head, as indicated by the reference line 34 in FIGURE 2.

Referring to FIGURES 2 and 3, it may be seen that the shank 16 is formed with a plurality of radially spaced and longitudinally extending grooves 36. The purpose of the grooves 36 is to provide weakened sections or zones in the shank at which the latter will split as it is bulbed radially outwardly to form a blind head during the setting operation. The manner in which the formation of this blind head takes place is described in detail below in conjunction with the setting operation. Preferably, the grooves 36 are V-shaped in cross section (FIGURE 3) and extend from the underside of the head 18 toward, but stopping short of the blind end 20 of the shank. As illustrated, each of the grooves 36 cuts through—approximately 90%—of the wall thickness over the portion of the shank between a point adjacent the head to approximately the midpoint. From the latter point, both the depth and width of each of the grooves 36 decreases until the groove "runs out" slightly short of the blind end 20 of the shank 16. Although this groove configuration has been found to yield particularly advantageous results, it will be understood that the exact shape shown is not essential to operability.

Turning now to the cooperating setting pin 14, it includes a pulling section 40 and a stem 42. The stem 42 is generally cylindrical in shape and is of a diameter at least slightly smaller than that of the sleeve bore 22, so that the stem is received loosely in the bore. A series of annular locking grooves 44 are formed in an intermediate portion of the stem and are adapted to receive a portion of the locking crown 24, as the latter is buckled inwardly during the setting operation to be described. Commencing with the groove 44*a* nearest the pulling section 40 and proceeding toward the blind end of the pin, i.e. from left to right in FIGURE 2, the grooves 44 are successively deeper. Moreover, all grooves 44 are formed so that the pin 14 is of lesser diameter at even the shallowest one (44*a*) than at any of the remaining ungrooved portions of the stem 42 and the pulling section 40. Therefore, it will be understood that the pin 14 has a weakened section at the groove 44*a*, and has successively weaker sections at each of the remaining grooves 44 progressively toward the blind end thereof. The final groove 44*b* is, therefore, the weakest section of the pin. The reason for so forming these grooves 44 will be brought out in detail below in the discussion of the setting operation.

It is convenient to roll the locking grooves 44 into the stem. Because of this method of forming, annular ridges 46 are provided intermediate adjacent grooves. The outer diameter of these ridges 46 is preferably substantially equal to, but no greater than the diameter of the bore 22 in the sleeve 12. With such relative diameters, the stem 42 is adapted to be received in the bore 22 with the ridges 46 in a close sliding fit, as illustrated in FIGURE 2.

In the illustrative embodiment of the invention, the pulling section 40 need not enter the bore 22 and, therefore, it may be of a diameter greater than that of the rest of the pin. In order to facilitate gripping of the pulling section 40 when setting the rivet, it is preferably formed with a plurality of conventional relatively shallow annular grooves 48.

It is desired, in order to achieve positive locking of the sleeve 12 and pin 14 in the setting operation, that the metal of the ridges 46 intermediate the locking grooves 44 have a relatively high unit hardness so as not to deform when subjected to force. Such a desired unit hardness is achieved in the present pin by virtue of the manner in which it is formed. In such forming, a length of wire is first cold formed in a header to provide a pin having the general shape of the final product, but for the grooves 44 and 48. After cold heading, the grooves 44 and 48 are rolled in their respective positions, as suggested above. Forming of the grooves in this manner results in the metal of the ridges 46 intermediate adjacent grooves 44 being cold worked and thereby hardened.

The relative lengths of the various sections of the sleeve 12 and pin 14 in a particular rivet depend primarily on the range combined thicknesses or grip lengths of the work pieces to be riveted. In general, the sleeve 12 must be sufficiently long, so that when inserted in the apertures in the work pieces to be riveted with its head flush with the top side, the end of the shank 16 projects at least a small distance on the blind side. The stem 42 of the pin 14 must, of course, be long enough to extend inwardly to the end 20 of the sleeve and have its locking grooves 44 arranged so as to be longitudinally aligned with the locking crown 24 of the sleeve head 18 when the rivet is finally set.

With the foregoing discussion of the construction of the sleeve 12 and pin 14 in mind, it is believed that the cooperative association of the members to achieve riveting can best be understood by following through a description of the initial assembly and later setting operations. To assemble the rivet for packing and shipment, the stem 42 of the pin is first inserted in the sleeve 12. The positions of the parts after insertion are illustrated in FIGURE 2 where it may be seen that the end of the stem 42 abuts flush with the closed blind end 20 of the shank. When so assembled, the locking grooves 44 on the stem are all initially located inwardly of the head 18 or to the right in FIGURE 2. The pulling section 40 projects exteriorly of the sleeve 12 so that it may be conveniently gripped.

With the parts so positioned, the blind end of the pin is secured to the closed blind end 20 of the sleeve as at 49 by spot welding. Securing the parts together in this manner is particularly advantageous as it prevents them from inadvertently separating during shipment and insures that setting takes place in the manner desired.

The work to be riveted is assumed to comprise a pair of lapped work pieces 50 of relatively thin sheet material provided with aligned apertures 52 and initially separated a small distance, as shown in FIGURE 4. It is further assumed that the exposed top side **50*a* to which access may be had is to the left in FIGURE 4, whereas the blind side 50*b* is to the right. In positioning the rivet for setting, the blind end 20 is inserted from the top side into and through the aligned apertures. To facilitate insertion, the end 20 of the shank 16 is tapered slightly, as shown at 54. When finally positioned, the sleeve head 18 is pressed firmly against the top side 50*a* and the shank 16 as well as the stem portion housed therein project on the blind side 50*b*. In order to achieve maximum strength both shear and tension the relative diameters of the apertures 52 and the shank 16 are such that the shank may be quickly and easily inserted but with a minimum of free clearance. A washer (not shown) formed of a resilient, deformable material may be positioned between the head 18 and the top side 50*a*** of the work, where a watertight installation is desired.

Figures 5, 6, 7:
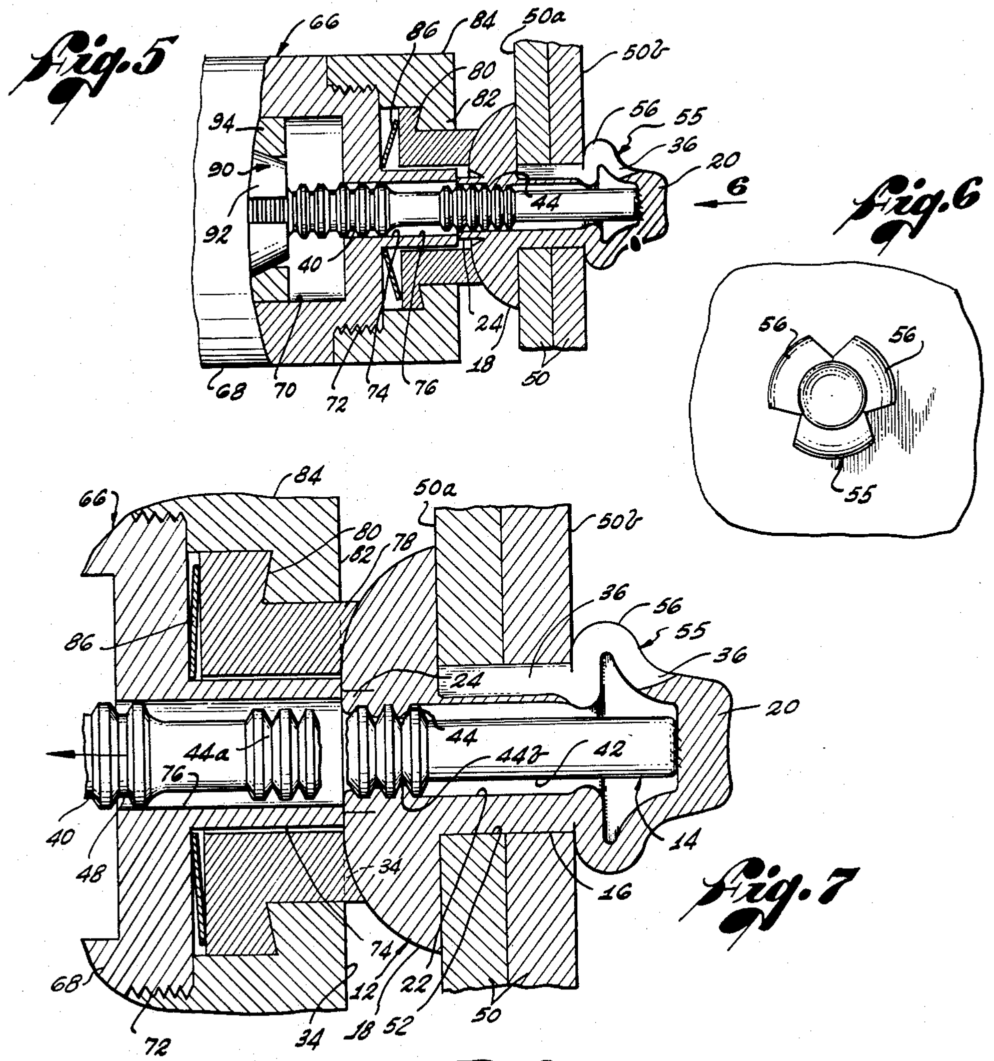
FIGURE 5 is a view similar to FIGURE 4 illustrating the various parts in relation to the work pieces at the completion of the first or clinching phase of the setting operation.
FIGURE 6 is an end elevation view taken in the direction of the arrow 6 in FIGURE 5.
FIGURE 7 is an enlarged view similar to FIGURE 5 showing the rivet as finally set in the work pieces in near minimum grip.

To commence the setting operation, an axial pulling force is applied to the pulling section 40 of the pin 14 and an axial reactive force is applied to the locking crown 24. It will be noted that the end 20 of the shank being joined to the stem 42 functions to transmit a longitudinal compressive force to the shank 16. This causes the tail end portion of the shank projecting on the blind side to bulk radially outwardly and begin forming a blind head 55. Because of the weakened sections of the shank provided by the grooves 36, splitting of the shank at those sections takes place almost immediately. Upon splitting, a plurality of petal-like projections 56 are formed, as illustrated in FIGURES 5 and 6. The number of projections 56 formed corresponds to the number of grooves 36 initially provided in the shank 16, with three being provided in the present case. Since the grooves 36 terminate short of the end 20 of the shank and in addition since that end is strengthened in the preferred embodiment by virtue of being closed, splitting likewise terminates short of the end.

Under the continued application of the pulling and reactive forces, the projections 56 continue to bulb outwardly and eventually contact the blind side **50*b* of the work. Since the individual work pieces 50** are initially separated a slight distance, as in FIGURE 4, they are clinched together to the position of FIGURE 5. For this reason, this phase of the setting operation may be considered as the clinching phase.

During bulbing or radial expansion of the petal-like projections 56 to form the blind head 55, the effective bearing area of the projections with the blind side **50*b* of the work or the effective area of the blind head 55 constantly increases. This bulbing responsive to the pin movement continues until the blind head 55 reaches about the condition shown in FIGURE 7. At that time, each of the projections 56 is folded substantially back on itself resulting in a sharp increase in resistance to further pin movement. Moreover, because of this increased resistance, the tension forces in the pin 14 and compressive forces in the locking crown 24 both correspondingly increase. When these forces reach a predetermined level, which is greater than that required to clinch the work pieces and form the blind head 55, relative movement of the pin ceases and the crown 24 buckles into the longitudinally aligned locking grooves 44 of the pin 14. After the adjacent locking grooves 44 have been filled with a material of the crown 24, the excess is flattened into the annular undercut groove 30 of the head 18, leaving the crown 24 generally flush with the top side of the head 18, as defined by the reference line 34**.

It will be noted that, after the crown 24 has been buckled, the two rivet parts are positively locked in assembly with one another. In this connection, it will be recalled that the annular ridges 46 between adjacent locking grooves are work hardened in the preferred embodiment. This insures that they retain their shape and, together with the buckling locking crown 24, effectively prevent further movement of the stem 42 of the pin 14 relative to the sleeve 12.

In the final phase of the setting operation, tension force in the pin 14 between the location at which the locking crown 24 is buckled into the locking grooves 44 in the pin and the location on pulling section where the pulling force is applied further increases, as does the reactive force now applied to the buckled crown 24. An important feature of the present invention is that when the forces reach a predetermined level, which is greater than that required to buckle the crown 24, the pin 14 fractures at the groove 44 located substantially in alignment with the top side of the sleeve head 18. The reason the pin fractures at this desired location is that this last mentioned groove, i.e. the one substantially flush with the top side of the head 18, is the weakest section of the pin over the length to which the increased tension force acts.

To further explain, it will be recalled that each of the grooves 44*a* to 44*b* is successively deeper. Since the pin 14 is gripped by the buckled locking crown 24, increased strain in the pin takes place essentially only over that length between the location at which gripping takes place and the location at which the pulling force is applied. Further, the pin 14 is weaker at the groove located substantially in alignment with the top side of the head 18 than at any of those to the left thereof in FIGURE 7 and, accordingly, the pin fractures at the former. Thus, the breakneck groove of the pin 14 may be considered as the particular one of the grooves 44 which is longitudinally aligned with the top side of the sleeve head 18 when the pin travel ceases.

Another important and somewhat related advantage of the present rivet is that when the pin fractures, there is virtually no spring back problem, such as has been encountered in the prior art. This follows from the fact that the pin 14 is gripped by the buckled locking crown 24 and, hence, locked in assembly with the sleeve 12 before fracturing takes place. Accordingly, tension is maintained in the stem portion locked within the sleeve, and the rivet maintains its maximum strength in shear and tension.

Figure 8:
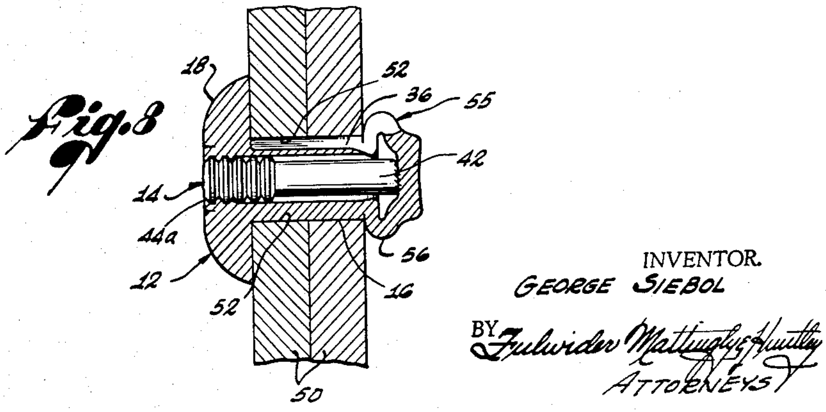
FIGURE 8 is a view similar to FIGURE 7 except that the rivet is shown in maximum grip.

Still another advantageous feature is that a rivet of any given size constructed in accordance with the inveniton is adapted to accommodate a wide range of grip lengths and still afford a highly satisfactory connection. By way of illustration, the rivet 10 is shown finally set in near minimum grip and in maximum grip in FIGURES 7 and 8, respectively. Accommodation of such a wide range of grip lengths is made possible by virtue of the constructions of the rivet parts and the manner in which they cooperate in the setting operation. Since it is the initially projecting portion of the shank 16 that bulbs outwardly and splits to form the individual projections 56 of the blind sleeve head 55, increasing the grip length of the work from that illustrated in FIGURE 7 to that illustrated in FIGURE 8 results in a corresponding decrease in the bearing area of the blind head 55. This assumes, of course, that the shank 16 is sufficiently long to initially project at least a small distance on the blind side. As would be expected, less pin travel is required to fully clinch the work pieces and form the blind head under maximum grip conditions. However, because the pin 14 has a plurality of locking grooves 44 spaced over a considerable longitudinal portion thereof, the first groove 44*a* is aligned with the top side of the sleeve head 18 when such movement ceases. Therefore, in this instance the groove 44*a* serves as the breakneck groove at which fracturing of the pin takes place.

From the above discussion, it will be appreciated that the bearing area of the blind head 55 varies in accordance with the grip length for any given size rivet. Moreover, when the grip length is maximum, the bearing area is minimum, and vice versa. It will also be appreciated that when the grip length is maximum, in all probability the work pieces are relatively thick, as in FIGURE 8, so that there is little chance of the blind head pulling through. Further, when the converse is true, i.e. the grip length is minimum, the work pieces are more apt to be formed of relatively thin sheet material, so that there is a strong possibility of the blind head pulling through under the influence of tension unless the bearing area is relatively large. In the rivet of the invention, a wide range of grip lengths is accommodated, yet the bearing area of the blind head varies in the desired manner. That is, in minimum grip where a large bearing area is required, it is afforded. Then, as grip length increases and most likely the necessity of a large bearing area decreases, a reduction in the bearing area takes place. Accordingly, the rivet of the invention is adapted to be used in a given size in a wide range of grip lengths and operating conditions to afford a highly satisfactory connection.

A slightly modified form 60 of the rivet of the invention is illustrated in FIGURE 9. The rivet 60 differs from the rivet 10 by virtue of incorporating a sleeve 61 with an axial bore 62 extending completely therethrough and a headed pin 63 receivable in the sleeve.

As suggested, the pin 63 embodies a blind head 64 integral with its stem and adapted to abut the terminal end of the shank 65. In order to prevent the head 64 from entering the bore 62 and at the same time to enable the assembled unit to be inserted in the work from the top side, the maximum outside diameter of the head 64 is about equal to, but no greater than, the outside diameter of the shank 65. The head is preferably frustoconical in shape, as shown to facilitate insertion of the assembled rivet 60 in the work to be riveted.

To assemble the parts of the rivet 60 for use to the positions shown in FIGURE 9, the pin 63 is inserted, pulling section (not shown) first, into the terminal end of the shank 65. When finally assembled, the blind head 64 of the pin abuts the end of the shank. Since the pulling section must pass through the sleeve in this embodiment, it is necessarily of a diameter slightly less than that of the bore 62.

Setting of the rivet 60 takes place in essentially the same manner as described above in conjunction with the preferred embodiment. As the pin 63 is pulled relative to the sleeve, bulbing and splitting of the shank 65 takes place. Since the longitudinal grooves in the shank 65 stop short its terminal end, splitting likewise stops short of that end, and the pin head 64 is prevented from entering the shank. Therefore, in this instance the pin head 64 serves to transmit a longitudinal compressive force to the shank 65 responsive to the rivet setting forces being applied.

A tool 66 for setting the rivet 10, as well as the modified rivet 60 in the manner set forth above is illustrated in FIGURE 4. The primary operational requirement of the tool 66, as suggested above, is that a pulling force be applied to the pulling section 40 and that a substantially equal and opposite reactive force be constantly applied in an axial direction to the locking crown 24.

As shown in FIGURE 4, the tool 66 includes a housing 68 having an axial bore 70. The forward end of the housing is necked down and externally threaded, as at 72. Projecting axially from the forward end of the housing 68 is an annular boss or thrust member 74 which is formed with a central bore 76 coaxial with the bore 70. The bore 76 is of a diameter such that the pulling section 40 of the pin 14 may be received freely therein and such that the forward end of the thrust member 74 may abut the locking crown 24 in setting the rivet.

Concentrically mounted on the thrust member 74 is an annular centering sleeve 78. The function of this centering sleeve 78 is to slip around the locking crown 24 when the tool 66 is being positioned for use to center the thrust member 74 with respect to the locking crown and insure that the pulling and reactive forces are applied in axial directions. To retain the centering sleeve 78 in assembly with the housing 68, it is formed with a radially projecting flange 80 at its rearward end. This flange 80 is adapted to abut a cooperating flange 82 on a retainer sleeve 84 screw threaded on the aforementioned externally threaded portion 72 of the housing 68.

When so mounted, the centering sleeve 78 is free for limited longitudinal movement with respect to the integral thrust member 74 and housing 68. A relatively light leaf spring 86 is disposed between the housing 68 and the centering sleeve 78 and serves to urge the latter to its extreme forward position, wherein it projects forwardly at the forward end wall of the thrust member 74. As shown, the sleeve 78 has sufficient freedom for longitudinal movement to enable it to move inwardly to a rearward position, wherein it is flush with the forward end wall of the thrust member 74. This insures that the reactive force is constantly applied to the locking crown 24 as the latter is buckled inwardly.

A collett like chuck 90 is provided for gripping the pin 14 and pulling it relative to the housing 68. The chuck 90 includes gripping jaws 92 and a concentrically mounted closing and pulling member 94. The chuck 90 is slidably mounted in the bore 70 of the housing 68 and adapted for movement from the initial operating position, illustrated in FIGURE 4, toward the left in that figure.

The forward ends of the gripping jaws 92, as well as the engaging surface of the closing and pulling member 94, are frusto-conical in shape, so that when an axial force is applied to the member 94 to move it outwardly or to the left in FIGURE 4, the jaws 92 are clamped inwardly toward one another. It will readily be appreciated that when such an actuating force is applied, the jaws 92 clamp the pulling section 34 of the pin 14 and pull the pin in the desired manner. Preferably, the inner walls of the jaws 92 are grooved to mate with the annular grooves 48 on the pulling section of the pin and insure positive gripping. A suitable actuating mechanism (not shown) is provided for so urging the member 94 to the left in FIGURE 4 toward the position of FIGURE 5. Such mechanism also operates in a known manner to return the member 94 to its initial position to release the jaws 92 for insertion of a new rivet.

In use, assuming the rivet 10 to have been positioned in the work pieces, the setting tool 66 is simply applied over the projecting pulling section 40 of the pin 14 to the position shown in FIGURE 4. The jaws 92 are initially separated a sufficient amount to receive the pulling section. When the thrust member 74 is positioned in abutment with the locking crown 24, the tool 66 is actuated to move the member 94 with respect to the housing from the position of FIGURE 4 toward that of FIGURE 5. As described above, this serves to clamp the jaws 92 on the pulling section 34 and pull the pin relative to the housing 68 and exert an opposite force on the locking crown 24. Setting of the rivet takes place in the manner described in detail above with the operation being terminated when the pin fractures at one of the grooves 44, separating the pulling section 40 from the remaining portions of the rivet. When this separation takes place, the pulling assembly 90 preferably springs back to its original position, illustrated in FIGURE 4, whereupon the jaws 92 separate and the broken off portion of the pin 14 is either ejected from the tool 66 or released and drops free of the housing.

From the above description of the setting tool 66 it will be appreciated that it is extremely simple in construction and, hence, inexpensive to manufacture. The use of such a tool to yield the highly effective results obtained in the present case is made possible by the specified rivet parts and the particular manner in which they cooperate in the setting operation. As explained, the tool need only apply pulling force to the pin 14 and reactive force to the locking crown 24 on the sleeve 12.

Although certain embodiments of the invention have been shown and described in considerable detail, it will be understood that various changes in the details of construction and arrangement may be made without departing from the spirit and scope of the invention, as defined in the appended claims.

I claim:

1. A blind rivet adapted to be inserted from the top side and set in the aligned apertures in a plurality of work pieces, comprising:

a tubular sleeve including a shank having a radially enlarged head at one end provided with a locking crown projecting axially in a direction opposite said shank, said locking crown being adapted to buckle inwardly when the axial compressive force therein reaches a predetermined level, there being a plurality of angularly spaced and longitudinally extending weakened sections in said shank to permit lateral expansion of said shank and splitting apart of the same at said weakened sections upon axial compression thereof;

a pin including a stem initially disposed within said sleeve and a pulling section projecting exteriorly of the headed end of said sleeve, said stem being formed with a plurality of locking grooves one of which is longitudinally aligned with said locking crown to receive said locking crown when the latter is buckled inwardly to lock said sleeve and pin together, another one of said grooves being longitudinally aligned substantially flush with the top side of said head to fracture after said crown buckles inwardly, said pin having all portions thereof from and including said pulling section to a said groove nearest said pulling section of a greater cross section than at any of said grooves whereby fracture will taken place at one of said grooves, said grooves being successively deeper commencing with the groove nearest said pulling section and proceeding toward the opposite end of said stem, whereby said pin fractures at the one of said grooves located substantially flush with the top side of said head when the tension force in said pin exceeds the compressive force required to so buckle said crown;

and means on said stem and said shank for transmitting a longitudinal compressive force to said sleeve at the end of said shank opposite said head responsive to an axial pulling force being applied to said pulling section and an opposite reactive force being applied to said locking crown.

2. A blind rivet adapted to be inserted from the top side and set in the aligned apertures in a plurality of work pieces, comprising:

a tubular sleeve including a shank having a radially enlarged head at one end provided with an integral locking crown projecting axially in a direction opposite such shank and being closed at its opposite end, there being a plurality of angularly spaced and longitudinally extending grooves in said shank that terminate short of said opposite end;

and a pin including a stem initially disposed within said sleeve and secured to the closed end of said shank and a pulling section projecting exteriorly of the headed end of said sleeve, said stem being formed with a plurality of locking grooves, said grooves being successively deeper commencing with the groove nearest said pulling section and proceeding toward the opposite end of the stem, the sleeve and pin cooperating so that when an axial pulling force is applied to said pin and a reactive force is applied to said locking crown, said pin moves relative to said shank causing said shank to bulb radially outwardly intermediate its ends and split apart at said shank grooves to form a plurality of petal-like projections and, thereafter, when the resistance to pin travel reaches a predetermined level, said crown buckles into longitudinally aligned ones of said locking grooves to lock said sleeve and pin together, and upon the continued application of said forces, said pin fractures at the locking groove located substantially flush with the headed end of said sleeve, said pin having said locking grooves located so that one said groove will lie substantially flush with the headed end of said sleeve to fracture upon the continued application of said force and at least one said groove will lie within said locking crown when said crown buckles to lock said pin to said sleeve, said pin having all portions thereof from and including said pulling section to a said groove nearest said pulling section of a greater cross section than at any of said grooves whereby fracture will take place at one of said grooves.

3. A blind rivet adapted to be inserted from the top side and set in the aligned apertures in a plurality of work pieces, comprising:

a tubular sleeve including a shank having a radially enlarged head on one end provided with a locking crown projecting axially in a direction opposite said shank, said locking crown being adapted to buckle inwardly when the axial compressive force therein reaches a predetermined level, there being a recessed annular undercut groove in said head immediately adjacent to and spaced radially outwardly of said locking crown, said sleeve being adapted to be inserted into said aligned apertures in said work pieces with said head abutting the top side and said shank projecting from the opposite blind side of the same, the projecting portion of said shank being adapted to radially expand to form a blind head which cooperates with said sleeve head to clamp said work pieces therebetween responsive to an axial compressive force of a predetermined level less than that required to so buckle said locking crown being transmitted to said shank;

and a pin including a stem initially disposed within said sleeve and operatively connected to the end of said shank opposite said head so as to transmit tension in said pin to an axial compressive force in said sleeve, and a pulling section projecting exteriorly from the headed end of said sleeve, said stem being formed with a plurality of adjacent locking grooves, said grooves being successively deeper, commencing with the groove nearest said pulling section and proceeding toward the opposite end of the stem, said pin having all portions thereof from and including said pulling section to a said groove nearest said pulling section of a greater cross section than at any of said grooves whereby fracture will take place at one of said grooves, at least one of said grooves other than the groove nearest said pulling section being longitudinally aligned with said locking crown when compression in said crown reaches the level required to buckle said locking crown, so as to receive the same as it is buckled inwardly, at least one of said grooves nearest said pulling section lying exteriorly of said sleeve when said locking crown buckles whereby fracture takes place at one of said exteriorly located grooves, and thereafter, said pin being adapted to fracture at a groove substantially flush with the top side of said head when tension in said pin reaches a level greater than the axial compressive force required to so buckle said locking crown.

4. A blind rivet comprising:

a tubular sleeve having a shank, a laterally extending head at one end and an axial bore extending therethrough from end to end, and a locking crown on said sleeve adjacent said head adapted to buckle radially inwardly upon the application of a predetermined axially compressive force, the walls of said shank being formed with a plurality of angularly spaced and longitudinally extending weakened sections to permit lateral bulbing of said shank intermediate its ends and splitting of the same at said weakened sections upon axial compression thereof;

a setting pin including a stem initially disposed in said bore and a blind head projecting from and engageable with the end of said shank opposite said head, and a pulling section projecting from said sleeve at the headed end thereof, said stem being formed with a plurality of adjacent locking grooves arranged so that at least one of said grooves other than the groove nearest said pulling section is substantially longitudinally aligned with a portion of said head adjacent said crown following bulbing of said shank whereby said locking crown may buckle into said grooves, and at least one said groove nearest said pulling section lying exteriorly of said sleeve when said locking crown buckles whereby fracture takes place at one of said exteriorly located grooves, said pin having all portions thereof from and including said pulling section to a said groove nearest said pulling section of a greater cross section than at any of said grooves whereby fracture will take place at one of said grooves, said grooves being successively deeper commencing with the groove nearest said pulling section and proceeding toward the opposite end of said stem;

gripping means formed on the projecting pulling section of said pin whereby to grip and pull the same to axially compress said shank;

said locking crown on said sleeve adjacent said head adapted to be buckled into one or more of said locking grooves to lock said sleeve and pin together.

5. A blind rivet adapted to be inserted from the top side and set in the aligned aperture in a plurality of work pieces, comprising:

a tubular sleeve including a shank having a plurality of angularly spaced and longitudinally extending grooves and a radially enlarged head at one end of said shank with a locking crown projecting axially therefrom in a direction opposite said shank, each of said grooves having a depth over a portion of their lengths of at least a major portion of the wall thickness of said shank and extending from a point adjacent said head toward, but stopping short of the opposite terminal end, said shank being adapted to be inserted into said aligned apertures in said work pieces with the head abutting the top side and the terminal end thereof projecting on the blind side of the same;

and a pin including a stem initially disposed within said sleeve, a pulling section projecting exteriorly from the headed end of said sleve, and a blind head projecting from and engageable with the terminal end of said shank, said stem being formed with a plurality of adjacent and successively deeper locking grooves, commencing with the groove nearest said pulling section and proceeding toward the opposite end of said stem, said shank being adapted, upon an axial pulling force being applied to said pin and an axial reactive force to said crown, to bulb radially outwardly intermediate its ends and split apart at said shank grooves to form a plurality of petal-like projections which pressurally engage the blind side of the work pieces, and when the forces reach a predetermined level greater than that required to so form said projections, said locking crown being adapted to buckle into longitudinally aligned ones of said locking grooves to lock said sleeve and said pin together, and thereafter, when said forces reach a predetermined level greater than that required to so buckle said locking crown, said pin being adapted to fracture at the locking groove longitudinally aligned with the top side of said sleeve head said pin having said locking grooves located so that at least one said groove will lie within said locking crown when said locking crown buckles to lock said sleeve to said pin and at least one said groove will lie longitudinally aligned with the top side of said sleeve head to fracture when the forces in said pin reach said predetermined level greater than that required to buckle said locking crown, said pin having all portions thereof from and including said pulling section to a said groove nearest said pulling section of a greater cross section than at any of said grooves whereby fracture will take place at one of said grooves.

References Cited by the Examiner

UNITED STATES PATENTS

| | | | |
|---|---|---|---|
| 2,061,628 | 11/36 | Huck | 85—40 |
| 2,092,682 | 9/37 | Roske | 85—40 |
| 2,435,144 | 1/48 | Kubicki | 85—40 |
| 2,955,505 | 10/60 | Schuster | 85—5 |
| 3,055,255 | 9/62 | Burrell | 85—40 |

FOREIGN PATENTS

| | | |
|---|---|---|
| 209,951 | 8/57 | Australia. |

EDWARD C. ALLEN, *Primary Examiner.*

CARL W. TOMLIN, *Examiner.*